United States Patent [19]

Bergmann

[11] Patent Number: 4,889,157

[45] Date of Patent: Dec. 26, 1989

[54] CARTRIDGE VALVE ASSEMBLY

[75] Inventor: Konrad Bergmann, Wittlich, Fed. Rep. of Germany

[73] Assignee: American Standard Inc., New York, N.Y.

[21] Appl. No.: 253,270

[22] Filed: Oct. 4, 1988

[30] Foreign Application Priority Data

Oct. 8, 1987 [AT] Austria ................................ 2659/87

[51] Int. Cl.[4] ............................ F16K 5/04; F16K 5/18
[52] U.S. Cl. .................................. 137/454.5; 137/550; 251/304
[58] Field of Search .................. 137/454.5, 454.6, 550; 251/118, 304, 368

[56] References Cited

U.S. PATENT DOCUMENTS

| 3,561,729 | 2/1971 | Politz | 251/304 X |
| 3,810,602 | 5/1974 | Parkinson | 251/304 |
| 3,834,416 | 10/1974 | Parkison | 137/550 |
| 4,105,043 | 8/1978 | Nicolayczik | 137/454.5 X |
| 4,331,176 | 5/1982 | Parkison | 137/454.5 |
| 4,765,365 | 8/1988 | Roland | 137/550 |

FOREIGN PATENT DOCUMENTS

| 2225887 | 12/1973 | Fed. Rep. of Germany | 251/304 |
| 2093956 | 9/1982 | United Kingdom | 251/304 |

*Primary Examiner*—John Rivell
*Attorney, Agent, or Firm*—John P. Sinnott

[57] ABSTRACT

A top cartridge for an individual, sanitary, dual-control, shut-off valve is provided. The cartridge includes an upper stationary and a lower rotatable disk, each disk including port apertures. The disks are arranged with a defined clearance in the longitudinal direction of a driver pin. A driver is welded to the pin and includes a finger which engages the rotatable disk. The upper end of the pin is pressed within a spindle. The spindle is positioned within a bushing to prevent calcination and corrosion thereof. A seal is provided near the bottom end of the pin between the driver and the rotatable disk.

26 Claims, 2 Drawing Sheets

CARTRIDGE VALVE ASSEMBLY

BACKGROUND AND SUMMARY OF THE INVENTION

The invention relates to a top cartridge for an individual sanitary shut-off valve of the type including a threaded head piece capable of being sealed by means of an O-ring. The cartridge further includes a spindle, a movable sealing disk having port apertures and driven together with the spindle, a rotationally fixed sealing disk having port apertures, and a driver pin traversing the head piece, the stationary disk and then the movable disk, and connected at the bottom to a driver which engages a recess in the movable disk.

In known top cartridges of this kind, a disadvantage is that there sometimes will be leakage of water, and the spindle will be exposed to the hazards of corrosion and scale. A principal object of the present invention is to improve a top cartridge of the above-described type to provide a smooth functioning cartridge, and also prevent leakage, corrosion and scale.

According to the invention, in a top cartridge as described above, it is proposed that the driver pin be welded to the driver at the bottom, and the space between driver, pin and movable disk filled with packing material. In addition, the driver pin may be pressed into the spindle at the top to varying depths depending on the differences in thickness of the pair of disks. The disks are arranged to have lengthwise axial play and are therefore displaceable. The spindle is arranged in a bushing having an internal flange.

DETAILED DESCRIPTION OF THE INVENTION

Figure 1:
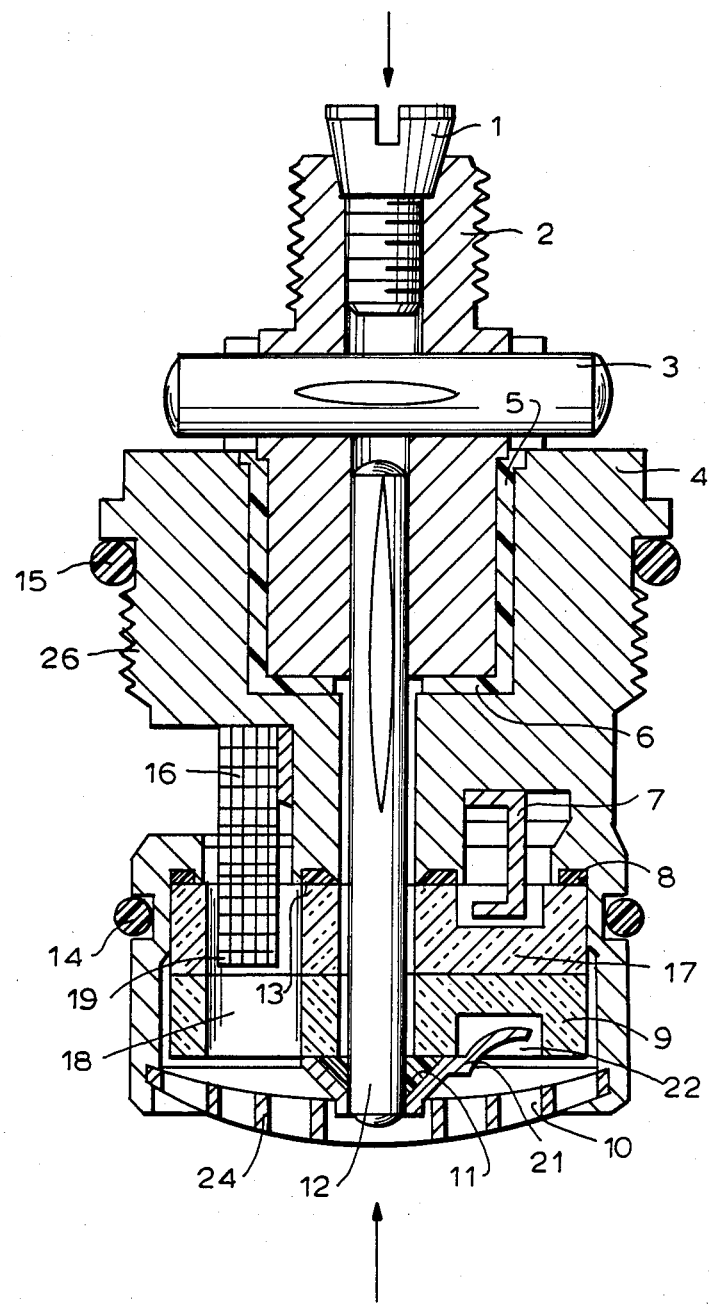
FIG. 1 is a sectional elevation view of a first embodiment of the invention.

FIG. 1 shows a sectional view of an assembled top cartridge for an individual sanitary shut-off valve. The cartridge is mounted in an opening by its thread 26 and sealed off by O-rings 14, 15. To control the flow of water, sealing disks 9 and 17 are provided, furnished with port apertures 18, 19, respectively. The sealing disks are primarily made of alumina ($Al_2O_3$), and surface polished so that the contacting faces of the two disks 9 and 17 form a good seal. A head piece 4, on which the thread 26 is provided, is mounted above the two disks. A spindle 2 is mounted within the head piece 4 and is connected to an operating lever by a ball grip screw 1. In the present case, the spindle 2 is press assembled to a driver pin 12 traversing the stationary disk 17 and the movable disk 9, the pin being laser-welded at the bottom to a driver 21. This driver engages a recess 22 in the movable disk 9, so that upon motion of the spindle 2 about its axis, the disk 9 is rotated by the driver pin 12 and the driver 21. According to their setting, a certain volume of water will be able to pass through the apertures 18 and 19 and flow on to the tap. To reduce noise, a fabric insert 16 or a screen is arranged at the exit port from the sealing disks. The spindle 2 is mounted in a bushing 5 having an internal flange 6. This bushing may advantageously be made of plastic, thus preventing corrosion and scaling of the spindle. The face of the head piece 4 is provided with seals 13 near the passage for the driver pin 12. Since the space at the end of the driver pin between pin 12, driver 21 and movable disk 9, is likewise filled with packing material 11, no water can leak along the spindle, so that a complete seal is maintained. There are no O-rings subject to dynamic loads at the spindle.

The pack of disks 9, 17 is arranged to have top and/or bottom clearances, that is, the pack of disks is not to be clamped in place. During installation of the cartridge, a clearance is selected, which may be between 0.05 and 0.1 mm, depending on the difference in thickness of the pair of disks, this clearance being dictated by manufacturing tolerances for ceramic materials. In other words, the pair of disks is always slightly displaceable longitudinally and axially, the movable disk 9 being always free-moving. The gap is adjusted by means of the driver pin 12, which may be pressed into the spindle 2 to varying depths, and consequently does not cooperate with any stop in the spindle 2.

The bottom of the head piece 4 is bell-shaped in construction, thereby enclosing the sealing disks 9 and 17. The bell-shaped part of the head piece 4 is closed off by a grid or coarse screen 24. In addition, a catch member 7 connects the head piece 4 to the stationary disk 17, providing additional security against leakage. To retain the head piece, a key 3 may be provided as well, inserted transverse to the vertical axis of the top cartridge.

Figure 2:
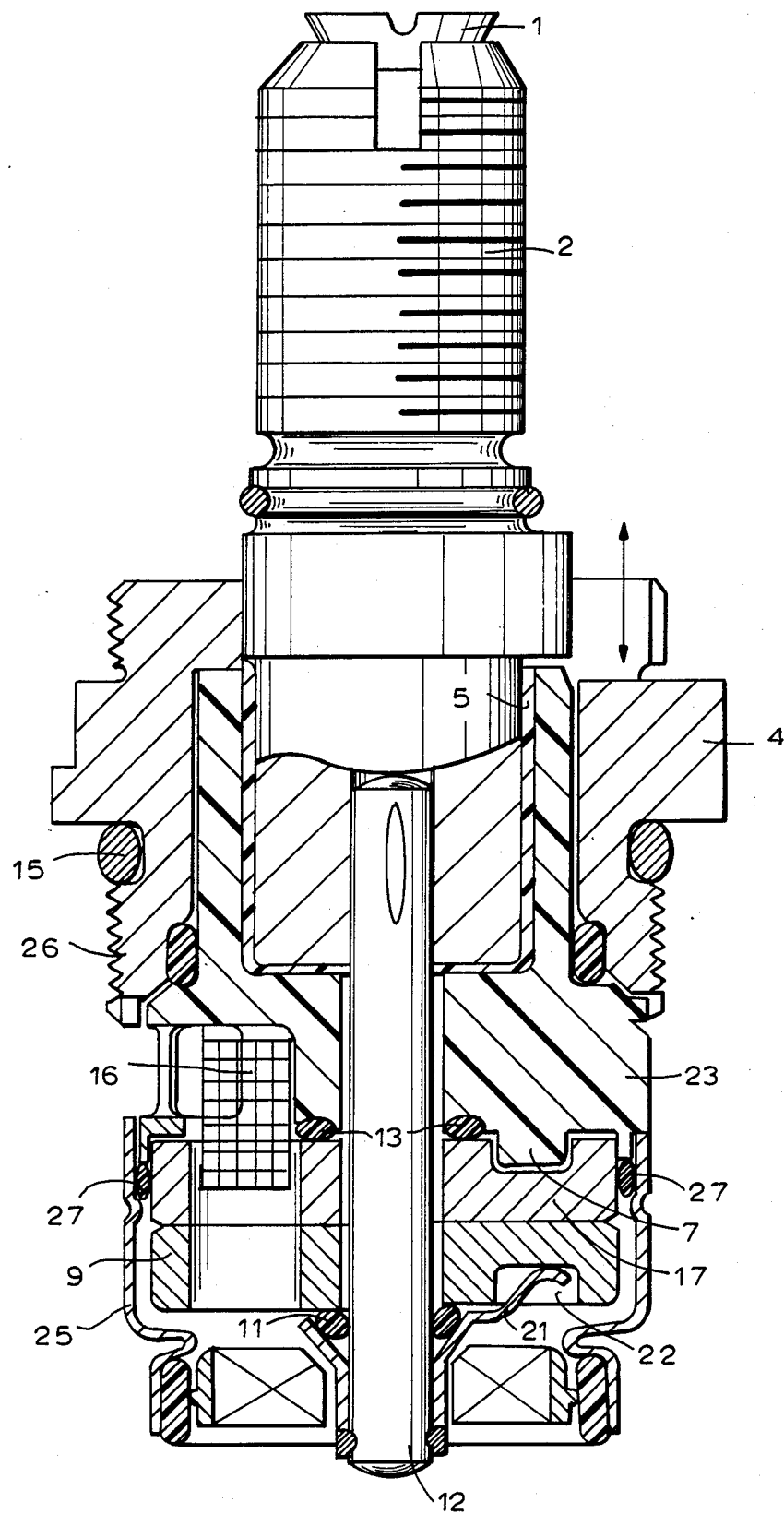
FIG. 2 is a sectional elevation view of a second embodiment of the invention.

FIG. 2 shows another embodiment of the invention. This figure likewise represents a sectional view of an assembled top cartridge for an individual sanitary shut-off valve. The same numerals are employed as in FIG. 1 to designate similar, though not necessarily identical components. A spindle 2 is again press assembled with a driver pin 12 and arranged in a bushing 5 having an internal flange 6. The bushing 5 and its flange 6 may be made of plastic. The top cartridge may be screwed into an opening (not shown) by means of the threaded section 26 of head piece 4. The sealing ring 15 seals off the top cartridge at the opening. Contrary to the embodiment of FIG. 1, in this embodiment the head piece 4 is seated on an intermediate member 23 in which firstly the bushing 5 with flange 6 and secondly the stop 7 for the stationary disk 17 are arranged. The head piece 4 may be lifted from the middle part 23 in unscrewed condition, and by rotating through 90 and then replacing it, a valve opening to the left may be converted into a valve opening to the right.

On the face of the middle part 23, again near the passage for the driver pin 12, there are seals 13, which together with the seals 27 serve for sealing off from the stationary disk 17. The driver pin 12 is secured to a driver 21 near its lower end which in turn engages a recess 22 in the rotatable disk 9. The two sealing disks 9 and 17 are here enclosed in a divided housing 25 of bellows-like construction to compensate for major installation tolerances. Seals 29 are provided near the bottom of the housing 25 to prevent leakage at the inflow port.

The middle part 23 may be made of plastic for reasons of cost, and in this way a highly dependable, inexpensive valve, adaptable to many different conditions, is obtained.

What is claimed is:

1. A top cartridge for a sanitary shut-off valve, comprising:

a head piece;

a spindle mounted to said head piece, said spindle including an axial passage extending therethrough;
a rotatable and axially displaceable sealing disk having an axial passage and a port aperture extending therethrough;
a rotationally fixed but axially displaceable sealing disk having an axial passage and a port aperture extending therethrough;
a driver pin press fit within said axial passage extending through said spindle, said driver pin also extending through said axial passages within said rotatable and rotationally fixed sealing disks, respectively;
said spindle including no stop within said axial passage within said spindle which engages said driver pin;
a driver mounted to said driver pin near one end thereof, said driver engaging said rotatable disk;
a space defined between said driver, said pin and said rotatable disk; and
packing material filling said space.

2. A top cartridge as defined in claim 1 including a bushing, one end of said spindle being mounted within said bushing.

3. A top cartridge as defined in claim 2 wherein said bushing is mounted to said head piece.

4. A top cartridge as defined in claim 2 including an intermediate member, said head piece being seated upon said intermediate member, said bushing being mounted to said intermediate member.

5. A top cartridge as defined in claim 4 including a catch member connecting said intermediate member to said rotationally fixed disk.

6. A top cartridge as defined in claim 4 including a housing mounted to said intermediate member, said sealing disks being positioned within said housing.

7. A top cartridge as defined in claim 4 wherein said intermediate member is made of plastic material.

8. A top cartridge as defined in claim 2 wherein said bushing includes an internally extending bottom flange, said one end of said spindle being seated upon said internally extending flange.

9. A top cartridge as defined in claim 2 wherein said bushing is made from plastic material.

10. A top cartridge as defined in claim 1 wherein said driver pin is welded to said driver.

11. A top cartridge as defined in claim 1 wherein said rotatable sealing disk includes a bottom recess, said driver including an engaging portion extending within said bottom recess.

12. A top cartridge as defined in claim 1 including a catch member connecting said head piece to said rotationally fixed disk.

13. A top cartridge as defined in claim 1 wherein said head piece includes a bell-shaped bottom portion, said sealing disks being positioned within said bell-shaped bottom portion.

14. A top cartridge as defined in claim 13 including a coarse screen mounted to said bottom portion of said head piece.

15. A top cartridge for a sanitary shut-off valve, comprising:
a head piece;
a spindle mounted to said head piece, said spindle including an axial passage extending therethrough;
a bushing including an internally extending bottom flange, said spindle including an end portion seated upon said internally extending bottom flange;
a rotatable and axially displaceable sealing disk having an axial passage and a port aperture extending therethrough;
a rotationally fixed but axially displaceable sealing disk having an axial passage and a port aperture extending therethrough;
a driver pin positioned within said axial passage extending through said spindle, said driver pin also extending through said axial passages within said rotatable and rotationally fixed sealing disks, respectively;
a driver mounted to said driver pin near one end thereof, said driver engaging said rotatable disk;
a space defined between said driver, said pin and said rotatable disk; and
packing material filling said space.

16. A top cartridge as defined in claim 15 wherein said driver pin is press fit within said axial passage extending through said spindle.

17. A top cartridge as defined in claim 15 wherein said internally extending flange defines an opening, said driver pin extending through said flange opening.

18. A top cartridge for a sanitary shut-off valve, comprising:
a head piece;
a spindle mounted to said head piece, said spindle including an axial passage extending therethrough;
a bushing, one end of said spindle being mounted within said bushing;
an intermediate member, said head piece being seated upon said intermediate member, and said bushing being mounted to said intermediate member;
a rotatable and axially displaceable sealing disk having an axial passage and a port aperture extending therethrough;
a rotationally fixed but axially displaceable sealing disk having an axial passage and a port aperture extending therethrough;
a catch member connecting said intermediate member to said rotationally fixed disk;
a driver pin positioned within said axial passage extending through said spindle, said driver pin also extending through said axial passages within said rotatable and rotationally fixed sealing disks, respectively;
a driver mounted to said driver pin near one end thereof, said driver engaging said rotatable disk;
a space defined between said driver, said pin and said rotatable disk; and
packing material filling said space.

19. A top cartridge as defined in claim 18 wherein said driver pin is press fit within said passage extending through said spindle.

20. A top cartridge as defined in claim 18 wherein said catch member is an integral projection extending from said intermediate member.

21. A top cartridge for a sanitary shut-off valve, comprising:
a head piece;
a spindle mounted to said head piece, said spindle including an axial passage extending therethrough;
a bushing, one end of said spindle being mounted within said bushing;
an intermediate member, said head piece being seated upon said intermediate member, and said bushing being mounted to said intermediate member;

a rotatable and axially displaceable sealing disk having an axial passage and a port aperture extending therethrough;

a rotationally fixed but axially displaceable sealing disk having an axial passage and a port aperture extending therethrough;

a housing mounted to said intermediate member, said sealing disks being positioned within said housing;

a driver pin positioned within said axial passage extending through said spindle, said driver pin also extending through said axial passages within said rotatable and rotationally fixed sealing disks, respectively;

a driver mounted to said driver pin near one end thereof, said driver engaging said rotatable disk;

a space defined between said driver, said pin and said rotatable disk, and packing material filling said space.

22. A top cartridge as defined in claim 21 wherein said driver pin is press fit within said axial passage extending through said spindle.

23. A top cartridge as defined in claim 21 including a seal mounted between said housing and said rotationally fixed disk.

24. A top cartridge as defined in claim 21 wherein said housing includes walls formed in a bellows configuration.

25. A top cartridge for a sanitary shut-off valve, comprising:

a head piece;

a spindle mounted to said head piece, said spindle including an axial passage extending therethrough;

a bushing, one end of said spindle being mounted within said bushing;

an intermediate member made from plastic, said head piece being seated upon said intermediate member, and said bushing being mounted to said intermediate member;

a rotatable and axially displaceable sealing disk having an axial passage and a port aperture extending therethrough;

a rotationally fixed but axially displaceable sealing disk having an axial passage and a port aperture extending therethrough;

a driver pin positioned within said axial passage extending through said spindle, said driver pin also extending through said axial passages within said rotatable and rotationally fixed sealing disks, respectively;

a driver mounted to said driver pin near one end thereof, said driver engaging said rotatable disk;

a space defined between said driver, said pin and said rotatable disk; and packing material filling said space.

26. A top cartridge as defined in claim 25 wherein said driver pin is press fit within said axial passage extending through said spindle.

* * * * *